United States Patent [19]
Kimball et al.

[11] Patent Number: 6,128,729
[45] Date of Patent: *Oct. 3, 2000

[54] METHOD AND SYSTEM FOR AUTOMATIC CONFIGURATION OF NETWORK LINKS TO ATTACHED DEVICES

[75] Inventors: Karen E. Kimball, Sacramento; Robert L. Faulk, Jr.; Robert M. McGuire, both of Roseville, all of Calif.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/991,943

[22] Filed: Dec. 16, 1997

[51] Int. Cl.[7] ............................................ G06F 13/10
[52] U.S. Cl. .............................. 713/1; 709/220; 709/238
[58] Field of Search ............................ 370/16.1, 85.13, 370/54, 255; 364/471.03; 709/200, 220, 238, 239; 713/1, 2, 100; 708/200

[56] References Cited

U.S. PATENT DOCUMENTS

| | | |
|---|---|---|
| 5,220,562 | 6/1993 | Takada et al. ................... 370/85.13 |
| 5,341,364 | 8/1994 | Marra et al. ...................... 370/16.1 |
| 5,465,251 | 11/1995 | Judd et al. ........................ 370/54 |
| 5,491,797 | 2/1996 | Thompson et al. ............. 395/200.03 |
| 5,515,376 | 5/1996 | Murthy et al. .................. 370/85.13 |
| 5,771,174 | 6/1998 | Spinner et al. ................. 364/471.03 |
| 5,802,042 | 9/1998 | Natarajan et al. ................ 370/255 |

*Primary Examiner*—Thomas C. Lee
*Assistant Examiner*—Omar A. Omar

[57] ABSTRACT

An intelligent network agent software application for multi-segment network devices (such as bridges or multi-segment repeaters) which have one or more network links automatically configures the network links. Several automatic configuration and loop-recovery features are encompassed, each of which applies toward intelligently making decisions on the user's behalf, without special knowledge or intervention on the part of the user. Such configuration includes: assigning bridged links to different segments (to maximize the connectivity offered by the bridging and to prevent looping); setting up bridged links on a bridge to form full connectivity across the network with another bridge; setting up redundant connections; disabling ports which are causing loops in the network, or other configuration actions. The agent is preferably fully embedded in the hardware device. However, the agent can also exist remotely and communicate with other software intelligence embedded in the hardware device via either an in-band (network) or an out-of-band (non-network) hardware connection.

61 Claims, 5 Drawing Sheets

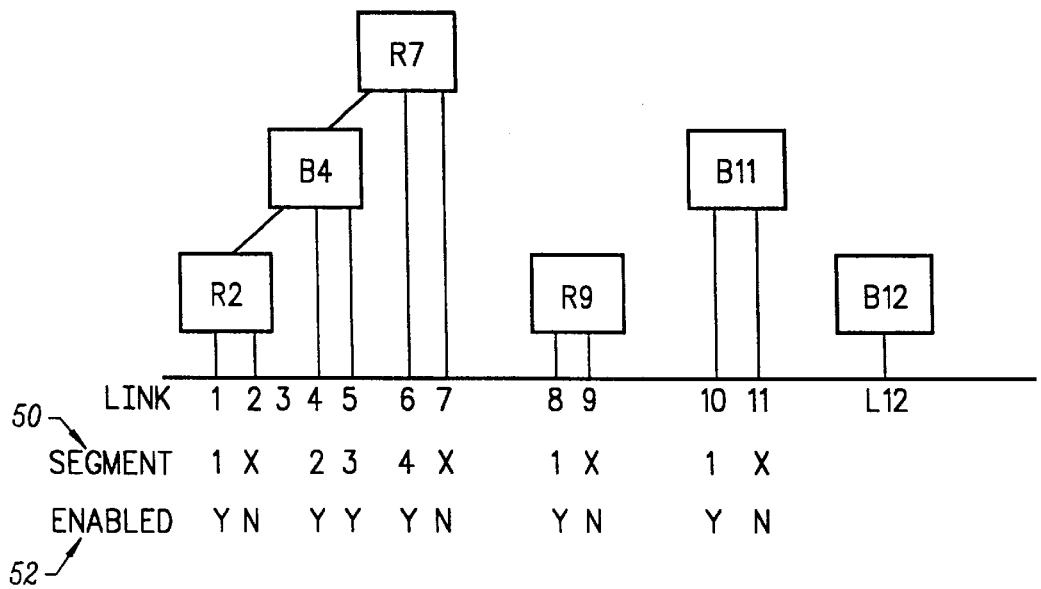
FIG. 4
FIG. 6
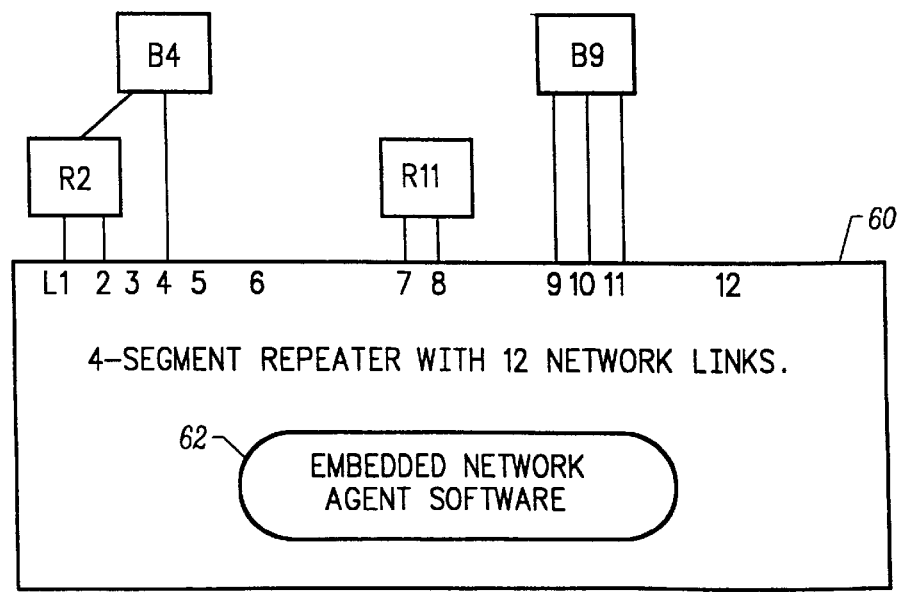
FIG. 7

METHOD AND SYSTEM FOR AUTOMATIC CONFIGURATION OF NETWORK LINKS TO ATTACHED DEVICES

BACKGROUND OF THE INVENTION

1. Technical Field

The invention relates to networked computer systems. More particularly, the invention relates to a method and system for automatically configuring multi-segment network device connections.

2. Description of the Prior Art

Computer network systems are inherently complex. A significant amount of technical education is required to understand, configure, and maintain any particular type of physical network, such as 10Base-T, Ethernet, Token Ring, or Token Bus networks. As the use of computer networks becomes widespread, new technicians are needed to maintain and operate those networks. These technicians may have little or no knowledge about networks, and may not ever fully understand networks, even with extensive training.

As a result, software schemes which can configure, maintain, or improve network conditions without requiring the user to have much specific technical knowledge are desirable. "Ease-of-use" and "user-friendly" schemes are often included in software applications that are embedded in, or located external to, the network devices. Such software applications are known as "intelligent network agents." An example of an intelligent network agent is disclosed in the U.S. patent application entitled, "Method and System for Automatic Detection of Bridged and Repeated Network Device Connections," U.S. Ser. No. 08/895,119, filed Jul. 16, 1997, and assigned to Hewlett-Packard Company.

The different types of network device connections between network links, along with their location in relation to a given hardware environment, are collectively known as a network's "topology."

For purposes of the discussion herein, a "repeater" is a device that is used to extend the length, topology, or interconnectivity of a physical cabling medium beyond that imposed by a single cable. Repeaters perform the basic actions of restoring the signal amplitude, waveform, and timing applied to the data signals.

For purposes of the discussion herein, a "bridge" is a multiport device connecting two or more network segments. When two stations on different network segments communicate with each other, the bridge forwards the packets between the two segments. When the stations are on the same segment, the bridge does not forward the packet to any other segment. The term "switch" can also be used interchangeably with the term "bridge."

One challenge facing a network administrator is correctly setting up a network. Setting up a network involves connecting devices together in such a way that they function as the administrator desires. An administrator who does not fully understand the workings of the devices, or the network itself, may not be able to set up the network properly. Unfortunately, there are no known satisfactory solutions to automatic configuration of external network device connections.

Physical connections in the network can create a loop. When such a loop occurs, it is very difficult or even impossible to exchange information reliably with other network software agents. Some network software agents may cease working altogether. Manually reconfiguring a network to remove loops requires a certain degree of skill, and can be time consuming.

A failure in a network link can cause loss of valuable data. It can therefore be desirable to provide a redundant connection to insure data continuity in the event of such link failure. The only known method for automatically removing a loop or automatically configuring such redundant connections is the Spanning Tree Protocol described in IEEE standard 802.1. However, this method cannot be implemented using repeaters.

It would therefore be an advantage to provide a new method and system for automatically configuring network links to attached devices which can be implemented with both bridging devices and repeaters. It would be a further advantage if such method and system also created redundant connections for increased device reliability, fixed network loops, and otherwise configured the devices to work together. It would be yet another advantage if such method and system were user-friendly and required no specific action on the part of the network administrator.

SUMMARY OF THE INVENTION

The invention is an "intelligent network agent" software application for use in configuring multi-segment network devices (such as bridges or multi-segment repeaters) which have one or more network links. The invention encompasses several automatic configuration and loop-recovery features, each of which apply toward intelligently making decisions on the user's behalf, without special knowledge or intervention on the part of the user.

Such configuration could include: assigning bridged links to different segments (to maximize the connectivity offered by the bridging and to prevent looping); setting up bridged links on a bridge to form full connectivity across the network; setting up redundant connections; disabling ports which are causing loops in the network, or other configuration actions.

In the preferred embodiment, the agent is fully embedded in that hardware device. However, in an alternative embodiment, the agent exists remotely and communicates with other software intelligence embedded in the hardware device via either an in-band (network) or an out-of-band (non-network) hardware connection. This out-of-band communication can remain operational even when loops are present in the network. While the target device has some embedded software intelligence in this alternative embodiment, the agent and thus the invention itself is not embedded.

BRIEF DESCRIPTION OF THE DRAWINGS

FIG. 4 is a chart of the types of connections in the first sample topology according to the invention;

FIG. 6 is a diagram of a configured hardware environment of that first sample topology according to the invention;

FIG. 7 is a diagram showing a second sample topology for a hardware environment according to the invention;

DETAILED DESCRIPTION OF THE INVENTION

The invention is an "intelligent network agent" software application for use in configuring multi-segment network devices (such as bridges or multi-segment repeaters) which have one or more network links.

The invention uses information regarding what kinds of devices are directly connected to the network links of a given hardware environment. This information can be automatically detected by the intelligent agent, furnished by another embedded or external application, or supplied by a user. The method for supplying such information does not affect the operation of the invention.

This information can then be used by the invention to automatically fix network problems, configure the network links, and/or offer users new "ease-of-use" features, or for other intelligent applications. Such configuration could include: assigning bridged links to different segments (to maximize the connectivity offered by the bridging and to prevent looping); setting up bridged links on a bridge to form full connectivity across the network; setting up redundant connections; disabling ports which are causing loops in the network; or other configuration actions. The invention encompasses several automatic configuration and loop-recovery features, each of which apply toward intelligently making decisions on the user's behalf, without special knowledge or intervention on the part of the user.

The invention is readily used with existing networks and devices, i.e. devices attached (either directly or indirectly) to the target device's network hardware environment may be of any known general purpose type and do not require special hardware or software to allow implementation of the invention.

Figure 1:
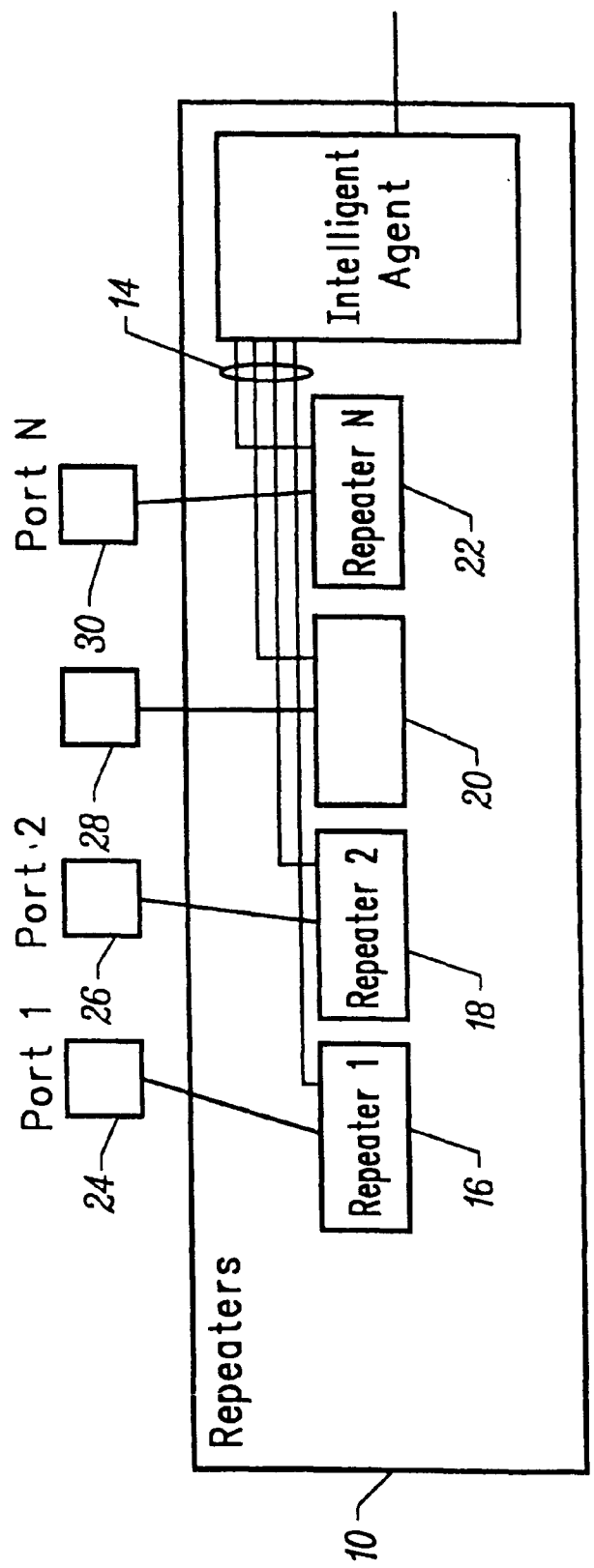
FIG. 1 is a diagram showing an embedded intelligent network agent according to the invention.

The intelligent network agent can be embedded in the hardware environment, or can be an external software application. FIG. 1 is a diagram showing an embedded intelligent network agent according to the invention. Repeaters 1 through N 16, 18, 20, 22, together form the repeater bus 14. Each target network device has associated Ports 1 through N, respectively 24, 26, 28, 30. In this first example, an intelligent agent software module 12 is fully embedded in the hardware environment 10 and is in direct communication with the repeater bus.

Figure 2:
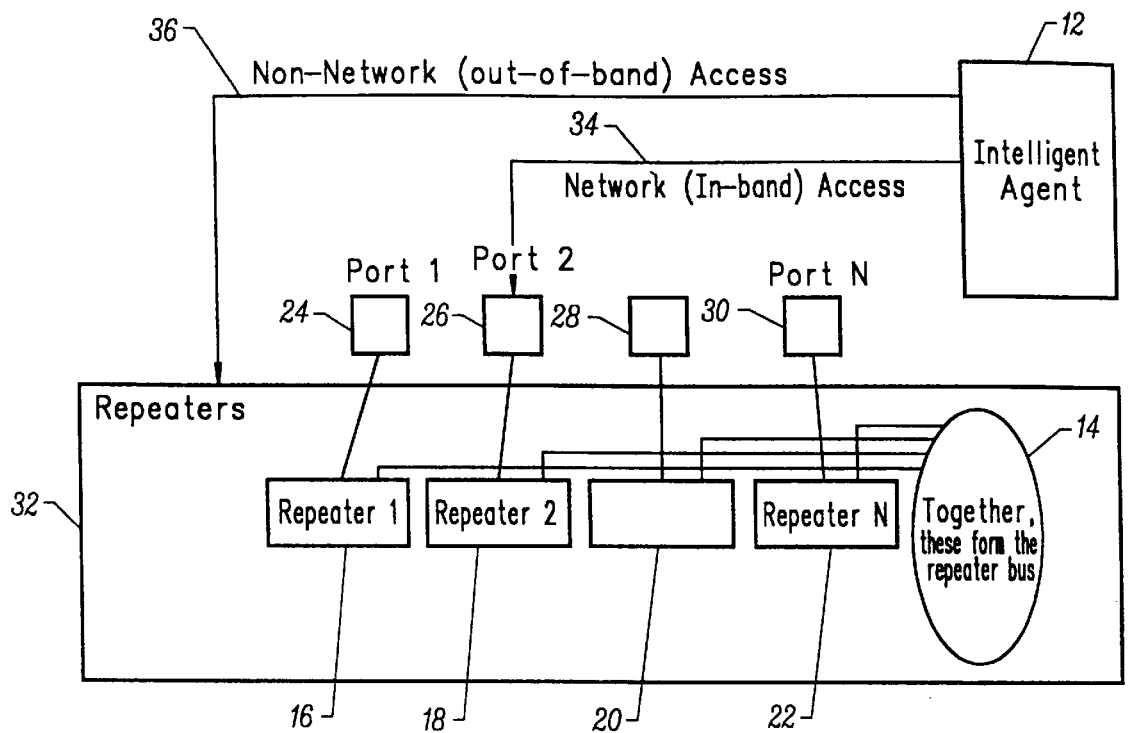
FIG. 2 is a diagram showing an intelligent network agent located external to the hardware environment.

FIG. 2 is a diagram showing an intelligent network agent located external to the hardware environment 32. In one embodiment, the intelligent network agent communicates with the repeater bus 14 through a port 26, using an in-band (network) hardware control connection 34. In another embodiment, the intelligent network agent communicates with the hardware environment through an out-of-band (non-network), hardware control connection 36. Such out-of-band communication can remain operational even when loops are present in the network.

Figure 3:
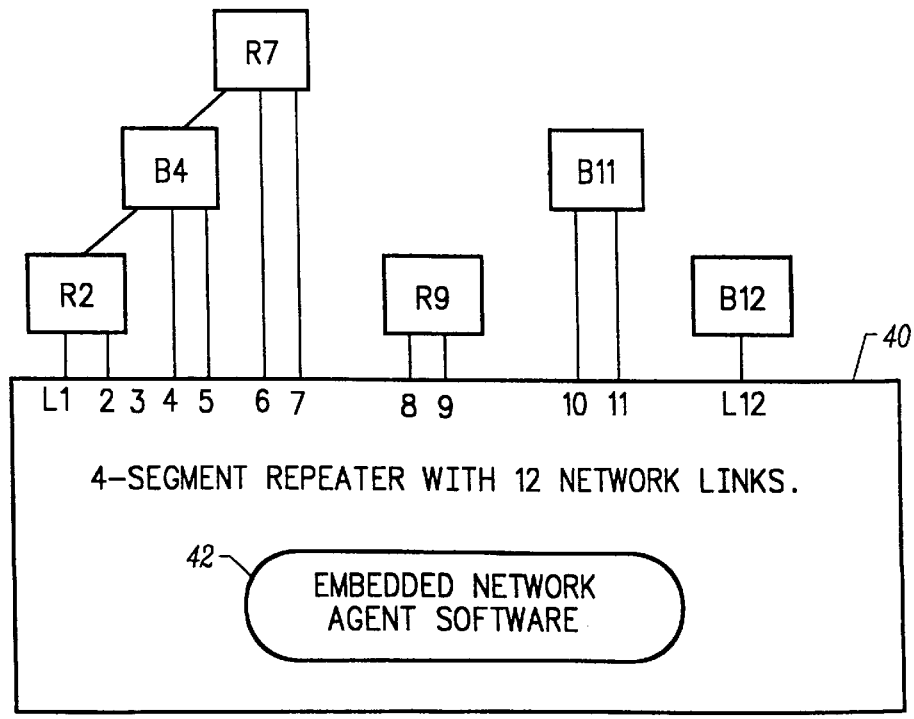
FIG. 3 is a diagram showing a first sample topology for a hardware environment according to the invention.

Given information noting how the hardware environment's network links are connected to one another, i.e. whether they are repeated, bridged, or not connected, the intelligent agent can automatically configure the environment such that bridging and repeating will work without creating loops. FIG. 3 is a diagram showing a first sample topology for a hardware environment according to the invention.

The sample agent hardware environment 40 is a four-segment repeater with twelve network links L1–L12. In FIG. 3, the intelligent network agent software 42 is fully embedded in the target device's hardware environment. However, the following discussion is equally applicable to an external agent and thus is provided for purposes of example and not as a limitation on the scope of the invention. Sets of repeating devices R2, R7, R9 and bridging devices B4, B11, B12 are directly connected to the target device's hardware environment.

FIG. 4 is a chart of the types of connections in the first sample topology according to the invention. In the chart, ConnToRptrSet 44 indicates if there is a repeating device between any two links. Similarly, ConnToBridgeSet 46 indicates if there is a bridging device between any two links. This information denotes precisely, from the target device's hardware environment view, what kind of device connection (s) attaches each link to the rest of the remaining links. Therefore, this information approximates the type of devices attached to each of the target device's links.

Links associated with a RepeaterSet are connected to one or more individual repeaters which collectively repeat data as a single logical repeater, and, for the purposes of this invention, are treated as a single repeater. For example, repeater R9 of FIG. 3 could actually consist of two repeaters, but is treated by this invention as a single repeater. Likewise, links associated with a BridgingSet are connected to one or more individual bridges, which collectively behave as a single bridge. Bridges forward packets if the destination is not on the originating segment and they filter when the destination is on the originating segment. The function of a bridge is to limit packets such that they only go on those segments which are needed.

The RepeaterSets and BridgingSets shown in FIG. 4 "govern" the connections between the links (i.e., they control the communications patterns). In FIG. 4, a comparison of links L1 through L12 has shown that repeating device R2 connects L1 to L2, while bridging device B4 is shown connecting L1 to L4–L7. Thus, while there may be other devices between these links in the target device's hardware environment that the agent is not able to detect, these devices do not determine the communication patterns between the links. For example, a repeating device or RepeaterSet located between Link5 and bridging device B4 would not affect communication between Link5 and other links in the hardware environment, and can be ignored for purposes of the invention.

When both a RepeaterSet and a BridgingSet are attached to the same link, the RepeaterSet takes precedence in governing the link. When a device set is attached only to a single link, such as in BridgingSet B12 in the Figure, this device set is not perceived by the hardware environment as affecting communications from that link, and is also ignored for the purposes of the invention.

Device distinction cannot be perceived beyond a BridgingSet. Thus, for Link1 of FIG. 4, both the RepeaterSet R2 and the BridgingSet B4 can be seen. However, the RepeaterSet R7 beyond BridgingSet B4 cannot be perceived and thus is ignored for purposes of the invention. Similarly, any connection beyond BridgingSet B4 cannot be perceived at either Link4 or Link5.

The invention uses an algorithm to configure such multi-segment target network devices having one or more network links. This algorithm can be used, for example, to ensure that any connection to a single bridging device is on its own segment. This algorithm makes use of bridging capabilities, while preventing the occurrence of loops.

Figure 5:
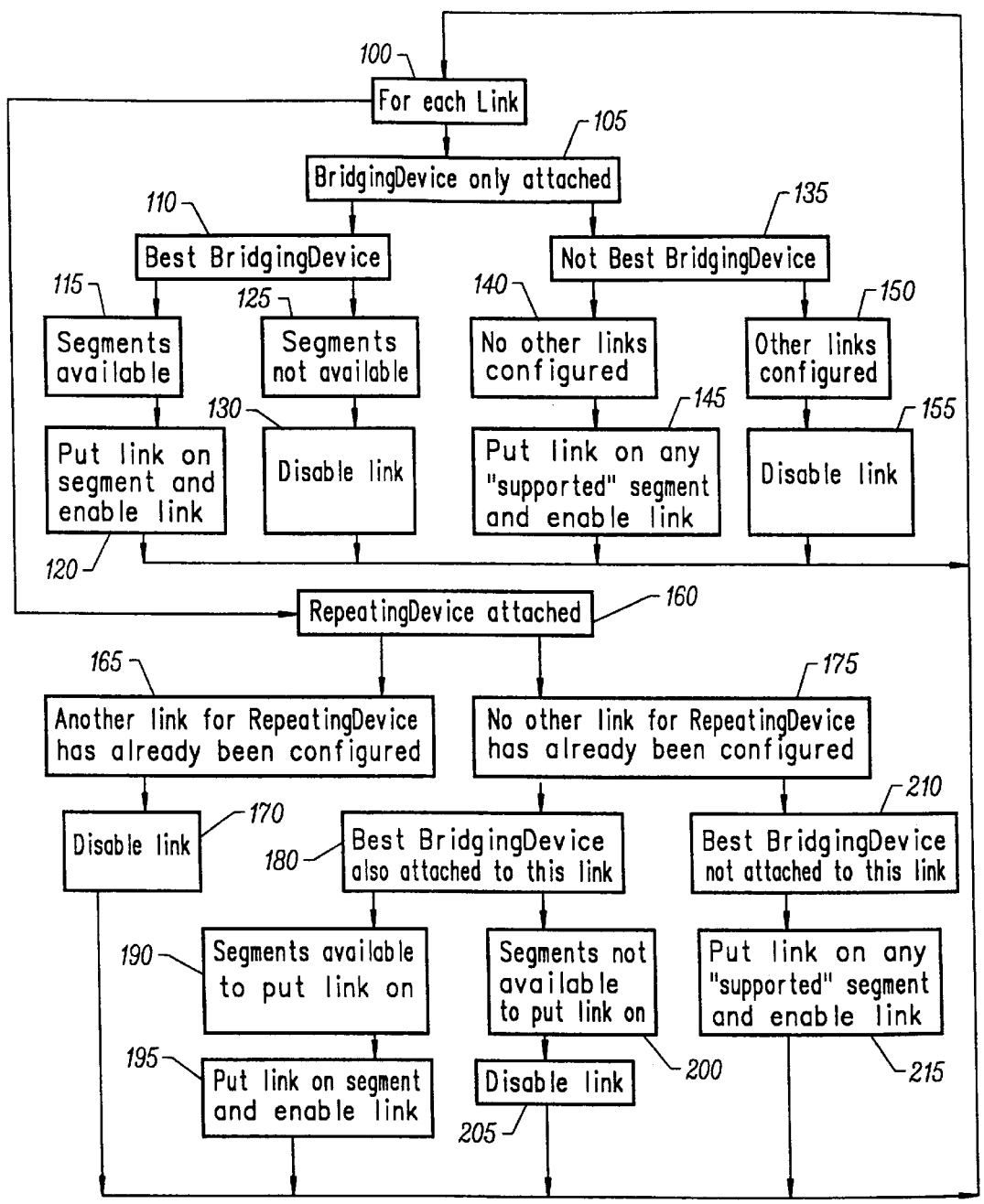
FIG. 5 is a flowchart of the algorithm used to automatically configure external network device connections according to a preferred embodiment of the invention.

FIG. 5 is a flowchart of the algorithm used to automatically configure external network device connections according to a preferred embodiment of the invention. For each link (100) in the network that has an attached BridgingDevice but no attached RepeatingDevice (105), it is first determined whether the BridgingDevice is the preferred ("Best") BridgingDevice.

The preferred BridgingDevice can be a device about which an application or user has provided specific information. Such information can include whether the device is recognized by the network or the user while other devices are not recognized, that the device is faster, or that the device is otherwise preferred. In a multi-segment hardware environment, the preferred BridgingDevice could be the device having the most connections.

The preferred embodiment of the invention is used with a four-segment hardware environment. However, the invention is also operable with other hardware environment configurations.

For the preferred BridgingDevice (110), if segments are available on which to put the link (115), the link is put on a segment and enabled (120). If segments are not available, (125), the link is disabled (130).

For a BridgingDevice that is not the preferred BridgingDevice (135), if no other links to this extra BridgingDevice have been configured (140), the link is put on any supported segment and enabled (145). A supported segment is one for which connectivity to other segments is supported. For example, a segment can be supported because the hardware environment is single-segment, or because bridging from the given segment to other populated segments can occur. If other links of the extra BridgingDevice have been configured (150), the link is disabled (155).

For a link that has an attached RepeatingDevice (160), if another link for the RepeatingDevice has already been configured (165), the link is disabled (170). If no other link for the RepeatingDevice has already been configured (175), and the preferred BridgingDevice is also attached to this link (180), it is then determined whether any segments are available on which to put the link. If segments are available (190), the link is put on a segment and enabled (195). If segments are not available (200), the link is disabled (205). If the preferred BridgingDevice is not attached to this link (210), the link is put on any supported segment and enabled (215).

The algorithm is further described in Table 1. Therefore, the data of FIG. 4 should be interpreted according to the pseudo-code listed in Table 1 below:

TABLE 1

For each Link (using ConnToBridgeSet and ConnToRptrSet info)
(
If any BridgingDevice attached AND no RepeatingDevice attached
   (
   if this is the "best" BridgingDevice in the hardware
         environment
      (
      if there are still segments available to put link on
         (
         put link on segCount segment and enable link
         segCount++
         )
      else disable link
      )
   else   / *Not the "best" one* /
      ( TABLE 1-continued if no other links to this extra BridgingDevice have
            been configured
         put link on any "supported" segment & enable link
      else disable link
      )
   )
else if any RepeatingDevice attached
   if another link for this RepeatingDevice has already been
            configured
      disable link
   else
      (
      if "best" BridgingDevice is also attached to this link
         (
         if there are still segments available to put link on
            (
            put link on segCount segment & enable link
            segCount++
            )
         else disable link
         )
      else put link on any "supported" segment & enable link
      )
   )
)

segCount = 0;

The "supported" segment, referred to in Table 1 (and discussed above), is a segment for which connectivity to other segments is supported. Connectivity is supported for such reasons as because the hardware environment is single-segment, or because bridging from the given segment to other populated segments can occur.

In the algorithm, any BridgingDevice is really a BridgingSet, and any Repeater is really a RepeaterSet. This algorithm is not a general purpose topology algorithm, in that individual bridges within a bridge set performing a bridging operation between a set of links connected to the target device are not identified. For example, in FIG. 4, BridgingSet B11 could in actuality be two or more separate bridges. However, for the purposes of the invention and this algorithm, they act as a single logical bridge. The same concept applies to repeaters.

Table 2 lists the actions resulting from the application, by the invention, of the Table 1 pseudo-code to the ConnToRptrSet and ConnToBridgeSet data of FIG. 4.

TABLE 2

| Link | ConnToBridge | ConnToRptr | ACTION |
| --- | --- | --- | --- |
| 1 | B4 | R2 | Put on segCount segment, segCount++ |
| 2 | B4 | R2 | Disable looping R2 Link2 |
| 3 | — | — | — |
| 4 | B4 | — | Put on segCount segment, segCount++ |
| 5 | B4 | — | Put on segCount segment, segCount++ |
| 6 | B4 | R7 | Put on segCount segment, segCount++ |
| 7 | B4 | R7 | Disable looping R7 Link7 |
| 8 | — | R9 | — |
| 9 | — | R9 | Disable looping R9 Link9 |
| 10 | B11 | — | Put on any supported segment |
| 11 | B11 | — | Disable looping B11 Link11 |
| 12 | — | — | — |

Hardware environment is then configured by the invention. FIG. 6 is a diagram of a configured hardware environment of that first sample topology according to the invention. FIG. 6 identifies the segments 50, and indicates 52 which segments have been disabled.

As shown in FIG. 6, looping links, such as Link2 to R2, Link9 to R9, and Link11 to B11 (see FIG. 3) are disabled. A device set, such as B12, that is attached to a single link is ignored.

FIG. 7 is a diagram showing a second sample topology for a hardware environment according to the invention. Intelligent network agent software 62 is embedded within the hardware environment. The sample agent hardware environment 60 is a four-segment Repeater with twelve network links L1–L12. The hardware environment also is directly attached to sets of repeating devices R2, R8 and bridging devices B4, B9.

The algorithm described in the Table 1 pseudo-code is applied to this second sample topology. In this example, the preferred BridgingDevice was chosen to be the second BridgingDevice B9 because B9 has more connected links than the other BridgingDevice, B4.

Table 3 lists the actions resulting from the application of the pseudo-code algorithm of Table 1 to the second sample topology of FIG. 7.

TABLE 3

| Link | ConnToBridge | ConnToRptr | ACTION |
| --- | --- | --- | --- |
| 1 | B4 | R2 | Put on any supported segment |
| 2 | B4 | R2 | Disable looping R2 Link2 |
| 3 | — | — | |
| 4 | B4 | — | Disable looping B4 Link4 |
| 5 | — | — | — |
| 6 | — | — | — |
| 7 | B9 | R8 | Put on segCount segment, segCount++ |
| 8 | B9 | R8 | Disable looping R8 Link8 |
| 9 | B9 | — | Put on segCount segment, segCount++ |
| 10 | B9 | — | Put on segCount segment, segCount++ |
| 11 | B9 | — | Put on segCount segment, segCount++ |
| 12 | — | — | — |

Figure 8:
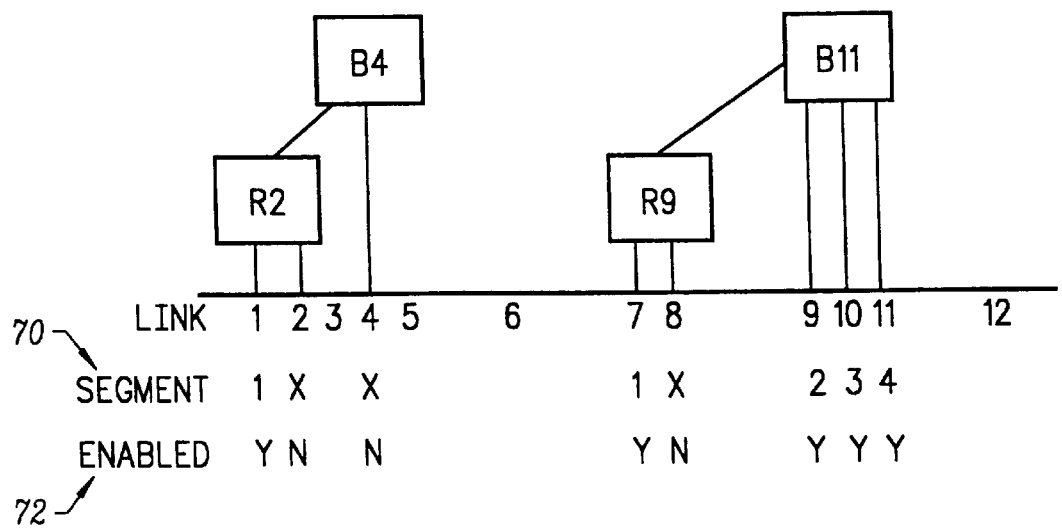
FIG. 8 is a diagram of a configured hardware environment of the second sample topology according to the invention.

The hardware environment is then configured by the invention. FIG. 8 is a diagram of a configured hardware environment of the second sample topology according to the invention. FIG. 8 identifies the segments 70, and indicates 72 which segments have been enabled. Looping links, such as Link2 to R2, Link4 to B4, and Link8 to R8 are disabled.

In an alternative embodiment of the invention, an added enhancement can be provided for any extra BridgingDevices. In this embodiment, if the preferred BridgingDevice has fewer links than the maximum possible number of segments, one or more of the extra bridging connections that were disabled can be put on the unused segments. This results in more complete bridging communication across all of the available segments in the hardware environment.

The invention can be used to automatically configure any disabled extra repeater or BridgingLinks as redundant connections. For example, Link2 of sample topology 1 (FIG. 3) can be configured as a redundant connection for Link1 to Repeater R2. Such an intelligent agent could then monitor the main link and cause the redundant link to activate if the main link failed.

In a topology having more BridgingSet connections than segments on which the connections can be put, an extra connection can be configured as a redundant connection for use in the event of the failure of any, or of a particular, BridgingSet link. This could ensure connectivity between all devices on the network which such intelligent agents could maintain in the event of link failure, thus automatically providing connectivity equivalent to that offered by 802.1 Spanning Tree.

The invention can also be used to automatically fix connected loops. For example, extra repeater or bridging connections can be disabled or moved to a new segment. Thus, any physical loops between two or more links are fixed.

Although the invention is described herein with reference to the preferred embodiment, one skilled in the art will readily appreciate that other applications may be substituted for those set forth herein without departing from the spirit and scope of the present invention.

The invention can be used with any suitable network system, including the AdvanceStack Switching Hub systems of Hewlett-Packard Company, Palo Alto, Calif.

The invention uses information provided by the user, the intelligent agent, or by other applications to automatically fix network problems and/or offer users new ease-of-use features. No user action is required for such corrections. For example, this information can be used to automatically configure network links, assign bridged links to different segments to maximize the connectivity offered by the bridging, and to prevent looping. The information may additionally be used in setting up bridged links on a bridge to form a Spanning Tree with another bridge, for setting up redundant connections, and for disabling ports which are causing loops in the network.

The invention is operable in response to manual or automatic triggering. Automatic triggering includes external or internal software applications, or general policies of the agent software configuration. Thus, the configuration may be performed as desired, at pre-determined times, or in response to detected operating conditions.

Accordingly, the invention should only be limited by the claims included below.

What is claimed is:

1. A method by which a multi-segment network device configures network device connections to a first link, the method comprising the following step:
   (a) if the multi-segment network device detects that a first bridging device is attached to the first link and that no repeating device is attached to the first link, performing the following substep:
      (a.1) if the first bridging device has been designated as a preferred bridging device, performing the following substeps:
         adding the first link to a segment, if available, that does not include a link to the first bridging device and
         if there is no segment available that does not include a link to the first bridging device, disabling the first link.

2. A method as in claim 1 wherein step (a) additionally includes the following substep:
   (a.2) if the first bridging device has not been designated as the preferred bridging device, performing the following substeps:
      if no other links to the first bridging device have been configured, adding the first link to any supported segment, and
      if another link to the first bridging device has already been configured, disabling the first link.

3. A method as in claim 1 additionally comprising the following substep:
   (b) if the multi-segment network device detects that a first repeating device is attached to the first link, performing the following substep:

(b.1) if another link to the first repeating device has already been configured, disabling the first link.

4. A method as in claim 3 wherein step (b) additionally includes the following substep:
   (b.2) if another link to the first repeating device has not already been configured and the preferred bridging device is also attached to the first link, performing the following substeps:
      adding the first link to a segment, if available, that does not include a link to the preferred bridging device, and
      if there is no segment available that does not include a link to the preferred bridging device, disabling the first link.

5. A method as in claim 4 wherein step (b) additionally includes the following substep:
   (b.3) if another link to the first repeating device has not already been configured and a bridging device which is not the preferred bridging device is attached to the first link, performing the following substep:
      adding the first link to any supported segment.

6. A method by which a multi-segment network device configures network device connections to a first link, the method comprising the following step:
   (a) if the network device detects that a first repeating device is attached to the first link, performing the following substeps:
      (a.1) if another link to the first repeating device has already been configured, disabling the first link
      (a.2) if another link to the first repeating device has not already been configured and a preferred bridging device is also attached to the first link, performing the following substeps:
         adding the first link to a segment, if available, that does not include a link to the preferred bridging device, and
         if there is no segment available that does not include a link to the preferred bridging device, disabling the first link.

7. A method as in claim 6 wherein step (a) additionally includes the following substep:
   (a.3) if another link to the first repeating device has not already been configured and a bridging device which is not the preferred bridging device is attached to the first link, performing the following substep:
      adding the first link to any supported segment.

8. A multi-segment network device comprising:
   a plurality of segments;
   a plurality of links;
   an agent used to configure network device connections to the plurality of links, the agent adding the first link to a segment, if available, that does not include a link to the preferred bridging device when the multi-segment network device detects that a first bridging device is attached to the first link, that no repeating device is attached to the first link and that the first bridging device has been designated as a preferred bridging device, the agent disabling the first link when the first bridging device is attached to the first link, no repeating device is attached to the first link, the first bridging device has been designated as the preferred bridging device and there is available no segment that does not include a link to the first bridging device.

9. A multi-segment network device as in claim 8 wherein the agent adds the first link to any supported segment when the multi-segment network device detects that a first bridging device is attached to the first link, that no repeating device is attached to the first link, that the first bridging device has not been designated as the preferred bridging device, and that no other links to the first bridging device have been configured, and the agent disables the first link when the multi-segment network device detects that a first bridging device is attached to the first link, that no repeating device is attached to the first link, that the first bridging device has not been designated as the preferred bridging device, and that another link to the first bridging device has already been configured.

10. A multi-segment network device as in claim 8, wherein the agent disables the first link when the multi-segment network device detects a first repeating device is attached to the first link and that another link to the first repeating device has already been configured, disabling the first link.

11. A multi-segment network device as in claim 10, wherein the agent adds the first link to a segment, if available, that does not include a link to the preferred bridging device when the multi-segment network device detects a first repeating device is attached to the first link, that another link to the first repeating device has not already been configured and that the preferred bridging device is also attached to the first link, and the agent disables the first link when the multi-segment network device detects a first repeating device is attached to the first link, that another link to the first repeating device has not already been configured, that the preferred bridging device is also attached to the first link, and that there is no available segment that does not include a link to the preferred bridging device.

12. A multi-segment network device as in claim 11 wherein the agent adds the first link to any supported segment step when the multi-segment network device detects the first repeating device is attached to the first link, that another link to the first repeating device has not already been configured, and that a bridging device which is not the preferred bridging device is attached to the first link.

13. A multi-segment network device comprising:
   a plurality of segments;
   a plurality of links;
   an agent used to configure network device connections to the plurality of links, the agent adding the first link to a segment, if available, that does not include a link to the preferred bridging device when the multi-segment network device detects a first repeating device is attached to the first link, that another link to the first repeating device has not already been configured and that the preferred bridging device is also attached to the first link, and the agent disabling the first link when the multi-segment network device detects a first repeating device is attached to the first link, that another link to the first repeating device has not already been configured, that the preferred bridging device is also attached to the first link, and that there is no available segment that does not include a link to the preferred bridging device.

14. A multi-segment network device as in claim 13 wherein the agent adds the first link to any supported segment step when the multi-segment network device detects the first repeating device is attached to the first link, that another link to the first repeating device has not already been configured, and that a bridging device which is not the preferred bridging device is attached to the first link.

15. A method by which a multi-segment network device configures network device connections to a first link, the method comprising the following step:

(a) if the multi-segment network device detects that a first bridging device is attached to the first link and that no repeating device is attached to the first link, performing the following substep:
  (a.1) if the first bridging device has been designated as a preferred bridging device, performing the following substeps:
    adding the first link to a segment, if available, that does not include a link to the first bridging device and
    if there is no segment available that does not include a link to the first bridging device, making the first link a redundant connection.

16. A method as in claim 15 wherein step (a) additionally includes the following substep:
  (a.2) if the first bridging device has not been designated as the preferred bridging device, performing the following substeps:
    if no other links to the first bridging device have been configured, adding the first link to any supported segment, and
    if another link to the first bridging device has already been configured, making the first link a redundant connection.

17. A method as in claim 16 additionally comprising the following substep:
  (b) if the multi-segment network device detects that a first repeating device is attached to the first link, performing the following substep:
    (b.1) if another link to the first repeating device has already been configured, making the first link a redundant connection.

18. A method as in claim 17 wherein step (b) additionally includes the following substep:
  (b.2) if another link to the first repeating device has not already been configured and the preferred bridging device is also attached to the first link, performing the following substeps:
    adding the first link to a segment, if available, that does not include a link to the preferred bridging device, and
    if there is no segment available that does not include a link to the preferred bridging device, making the first link a redundant connection.

19. A method by which a multi-segment network device configures network device connections to a first link, the method comprising the following step:
  (a) if the network device detects that a first repeating device is attached to the first link, performing the following substeps:
    (a.1) if another link to the first repeating device has already been configured, making the first link a redundant connection
    (a.2) if another link to the first repeating device has not already been configured and a preferred bridging device is also attached to the first link, performing the following substeps:
      adding the first link to a segment, if available, that does not include a link to the preferred bridging device, and
      if there is no segment available that does not include a link to the preferred bridging device, making the first link a redundant connection.

20. A multi-segment network device comprising:
  a plurality of segments;
  a plurality of links;
  an agent used to configure network device connections to the plurality of links, the agent adding the first link to a segment, if available, that does not include a link to the preferred bridging device when the multi-segment network device detects that a first bridging device is attached to the first link, that no repeating device is attached to the first link and that the first bridging device has been designated as a preferred bridging device, the agent making the first link a redundant connection when the first bridging device is attached to the first link, no repeating device is attached to the first link, the first bridging device has been designated as the preferred bridging device and there is available no segment that does not include a link to the first bridging device.

21. A multi-segment network device as in claim 20, wherein the agent disables the first link when the multi-segment network device detects a first repeating device is attached to the first link and that another link to the first repeating device has already been configured, making the first link a redundant connection.

22. A multi-segment network device as in claim 21, wherein the agent adds the first link to a segment, if available, that does not include a link to the preferred bridging device when the multi-segment network device detects a first repeating device is attached to the first link, that another link to the first repeating device has not already been configured and that the preferred bridging device is also attached to the first link, and the agent disables the first link when the multi-segment network device detects a first repeating device is attached to the first link, that another link to the first repeating device has not already been configured, that the preferred bridging device is also attached to the first link, and that there is no available segment that does not include a link to the preferred bridging device.

23. A multi-segment network device as in claim 22 wherein the agent adds the first link to any supported segment step when the multi-segment network device detects the first repeating device is attached to the first link, that another link to the first repeating device has not already been configured, and that a bridging device which is not the preferred bridging device is attached to the first link.

24. A multi-segment network device comprising:
  a plurality of segments;
  a plurality of links;
  an agent used to configure network device connections to the plurality of links, the agent adding the first link to a segment, if available, that does not include a link to the preferred bridging device when the multi-segment network device detects a first repeating device is attached to the first link, that another link to the first repeating device has not already been configured and that the preferred bridging device is also attached to the first link, and the agent making the first link a redundant connection when the multi-segment network device detects a first repeating device is attached to the first link, that another link to the first repeating device has not already been configured, that the preferred bridging device is also attached to the first link, and that there is no available segment that does not include a link to the preferred bridging device.

25. A method by which a multi-segment network device configures network device connections to a first link, the method comprising the following step:
  (a) if the network device detects that a first repeating device is attached to the first link, performing the following substeps:

(a.1) if another link to the first repeating device has already been configured, disabling the first link.

26. A multi-segment network device comprising:
a plurality of segments;
a plurality of links; and,
an agent used to configure the plurality of links, the agent obtaining information about devices connected to links in the plurality of links, and based on the information, the agent configuring each link by performing one of the following actions for each link:
disabling the link, and
assigning the link to one of the plurality of segments;
wherein in configuring links, the agent does not allow two links connected to a same external bridging device to be assigned to a same segment from the plurality of segments.

27. A multi-segment network device as in claim 26, wherein in configuring links, when more than one link from the plurality of links are connected to a first bridging device, a maximum number of links connected to the first bridging device are enabled with the following constraints:
no looping is caused, and
no two links connected to the first bridging device are assigned to a same segment from the plurality of segments.

28. A multi-segment network device as in claim 26 wherein the agent is embedded within hardware that is in a same housing that houses hardware implementing the plurality of segments.

29. A multi-segment network device as in claim 26 wherein the agent is embedded within hardware that is external to housing that houses hardware implementing the plurality of segments.

30. A multi-segment network device as in claim 26 wherein the multi-segment network device is one of the following:
a network bridge;
a switch;
a router;
a repeater; and
a multi-segment repeater.

31. A multi-segment network device as in claim 26 wherein the information about the devices connected to the links in the plurality of links is detected by the agent.

32. A multi-segment network device as in claim 26 wherein the information about the devices connected to the links in the plurality of links is furnished by an application that is external to the agent.

33. A multi-segment network device as in claim 26 wherein the information about the devices connected to the links in the plurality of links is supplied by a user of the multi-segment network device.

34. A method by which an agent configures a plurality of links within a multi-segment network device, the method comprising the following steps:
(a) obtaining, by the agent, information about devices connected to links in the plurality of links; and,
(b) based on the information, configuring, by the agent, each link, including one and only one of the following substeps being performed for each link:
(b.1) disabling the link, and
(b.2) assigning the link to one of a plurality of segments;
wherein in configuring links, the agent does not allow two links connected to a same external bridging device to be assigned to a same segment from the plurality of segments.

35. A method as in claim 34, wherein in step (b) the agent configures link so that when more than one link from the plurality of links are connected to a first bridging device, a maximum number of links connected to the first bridging device are enabled with the following constraints:
no looping is caused, and
no two links connected to the first bridging device are assigned to a same segment from the plurality of segments.

36. A method as in claim 34 wherein the multi-segment network device is one of the following:
a network bridging device;
a switch;
a router;
a repeater; and
a multi-segment repeater.

37. A method as in claim 34 wherein step (a) includes the following substep:
(a.1) detecting, by the agent, the information about the devices connected to the links in the plurality of links.

38. A method as in claim 34 wherein step (a) includes the following substep:
(a.1) receiving, by the agent, the information about the devices connected to the links in the plurality of links from an application that is external to the agent.

39. A method as in claim 34 wherein step (a) includes the following substep:
(a.1) receiving, by the agent, the information about the devices connected to the links in the plurality of links from a user of the multi-segment network device.

40. A system for reconfiguring a network communications topology ("NCT"), the system comprising;
a multi-segment device having a plurality of links and at least one segment; and
an agent that evaluates the NCT for bridging and repeating devices, and subsequently, for each link of the plurality of links,
assigns the link to a segment of the at least one segment or
disables the link from a segment of the at least one segment to reconfigure the NCT.

41. The system of claim 40, wherein the reconfiguration of the NCT is such that the bridging and repeating devices operate without looping.

42. The system of claim 40, wherein the reconfiguration of the NCT is such that the reconfiguration maximizes the number of available segments that can be bridged by the bridging device without looping.

43. The system of claim 40, wherein the agent assigns or disables each link of the NCT to reconfigure the NCT such that redundant connections to the bridging and repeating devices can be created.

44. The system of claim 43 wherein the agent monitors the active links of the redundant connections of the reconfigured NCT for link failure.

45. The system of claim 44, wherein the agent manages the redundant connections such that when a monitored link fails the agent reconfigures the NCT again by activating an appropriate redundant connection to replace a failed link.

46. The system of claim 40, wherein the bridging and repeating devices are external to the multi-segment device.

47. The system of claim 40, wherein the multi-segment device may be selected from the group including:
a router;
a bridging device;

a switch;

a repeater; and a multi-segment repeater.

48. The system of claim 40, wherein the agent evaluates the appropriateness of assigning the link to the segment based on one or more conditions selected from the group including:

the attached device is the preferred bridging device;

further segments are available within the multi-segment device on which to place links attached to the given bridging device; and placing a link on a given segment will not create a bridging or repeating loop in the attached topology; and this is the first instance of consideration for the attached repeating device.

49. The system of claim 40, wherein the agent disables the link from the segment when a predetermined condition is met, the conditions being selected from the group including:

there are no more available segments in the multi-segment device to which links attached to the given bridging device may be assigned without creating a loop; and a link to the attached repeating device has already been configured, thus any additional links to said repeating device must be disabled to prevent looping.

50. The system of claim 40, wherein the agent is embedded in and integrated with the multi-segment device.

51. The system of claim 40, wherein the agent is remotely connected to the multi-segment device via an out-of-band hardware control connection.

52. The system of claim 40 wherein the reconfiguration of the NCT may be triggered by manual or automatic means.

53. A method for reconfiguring a multi-segment device of a network communications topology ("NCT"), the device having a plurality of links and at least one segment, the method comprising:

evaluating the NCT for bridging and repeating devices residing external to the multi-segment device; and reconfiguring the multi-segment device using the NCT evaluation by:

assigning a link of the plurality of links to a segment of the at least one segment or disabling a link of the plurality of links from a segment of the at least one segment.

54. The method of claim 53, wherein the reconfiguration of the multi-segment device is such that the external bridging and repeating devices operate without looping.

55. The method of claim 53, wherein the reconfiguration of the NCT is such that the reconfiguration maximizes the number of available segments that can be bridged by the external bridging device without looping.

56. The method of claim 53, wherein the steps of assigning or disabling a link of the NCT to reconfigure the NCT may create redundant connections to the external bridging and repeating devices.

57. The method of claim 56, further including the step of monitoring the active links of the redundant connections of the reconfigured NCT for link failure.

58. The method of claim 57, further including the step of managing the redundant connections such that when a monitored link fails the step of reconfiguring occurs again to activate an appropriate redundant connection to replace the failed link.

59. A network management system for reconfiguring a network communications topology having bridging and repeating devices, the system comprising:

a multi-segment element having a plurality of links and at least one segment;

a network evaluation component that evaluates the bridging or repeating devices of the network communications topology for configuration conditions and determines a link assignment or link disablement action; and a network control element that either assigns a link of the plurality of links to a segment of the at least one segment or disables a link of the plurality of links from a segment of the at least one segment based on the determination of the network evaluation component.

60. The system of claim 59, wherein the determination for a link assignment by the network evaluation component occurs due to one or more of the following conditions selected from the group including:

the attached device is the preferred bridging device;

further segments are available within the multi-segment device on which to place links attached to the given bridging device;

placing a link on a given segment will not create a bridging or repeating loop in the attached topology; and this is the first instance of consideration for the attached repeating device.

61. The system of claim 59, wherein the determination for a link disablement by the network evaluation component occurs due to one or more of the following conditions selected from the group including:

there are no more available segments in the multi-segment device to which links attached to the given bridging device may be assigned without creating a loop; and a link to the attached repeating device has already been configured, thus any additional links to said repeating device must be disabled to prevent looping.

* * * * *

UNITED STATES PATENT AND TRADEMARK OFFICE
CERTIFICATE OF CORRECTION

PATENT NO. : 6,128,729
DATED : October 3, 2000
INVENTOR(S) : Kimball et al.

It is certified that error appears in the above-identified patent and that said Letters Patent is hereby corrected as shown below:

Column 6,
Line 24, delete "segCount = 0;"
Line 63, delete "Hardware" and insert therefor -- The hardware --
Line 67, delete "disabled" and insert therefor "enabled"

Signed and Sealed this

Eighth Day of April, 2003

JAMES E. ROGAN
*Director of the United States Patent and Trademark Office*